United States Patent
Topliss et al.

(10) Patent No.: US 10,725,288 B1
(45) Date of Patent: Jul. 28, 2020

(54) MIRROR TILT ACTUATOR AND BEARING FOR OPTICAL SYSTEM

(71) Applicant: Apple Inc., Cupertino, CA (US)

(72) Inventors: Richard J. Topliss, Campbell, CA (US); Yuval Gerson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 387 days.

(21) Appl. No.: 15/261,637

(22) Filed: Sep. 9, 2016

Related U.S. Application Data

(60) Provisional application No. 62/261,113, filed on Nov. 30, 2015.

(51) Int. Cl.
*G02B 26/10* (2006.01)
*G02B 26/08* (2006.01)
*H04N 5/225* (2006.01)

(52) U.S. Cl.
CPC ......... *G02B 26/105* (2013.01); *G02B 26/085* (2013.01); *G02B 26/0833* (2013.01); *H04N 5/225* (2013.01)

(58) Field of Classification Search
CPC .. G02B 26/08; G02B 26/0816; G02B 26/085; G02B 26/0833; G02B 26/10; G02B 26/105; G02B 26/101; G02B 26/127; G02B 21/0036; G02B 21/0048; H04N 5/225
USPC ......... 359/199.3–200.7, 201.2, 212.1, 213.1, 359/214.1, 219.1, 221.2, 221.3, 225.1
See application file for complete search history.

(56) References Cited

U.S. PATENT DOCUMENTS

| | | | |
|---|---|---|---|
| 2012/0193428 A1* | 8/2012 | Bu | G02B 26/105 235/462.36 |
| 2016/0178894 A1* | 6/2016 | Rose | G02B 26/105 359/199.3 |
| 2017/0371230 A1* | 12/2017 | Ko | G02B 7/1828 |

FOREIGN PATENT DOCUMENTS

| | | |
|---|---|---|
| CN | 104024918 | 9/2014 |
| JP | 2012049999 | 3/2012 |
| KR | 19990043694 | 6/1999 |
| WO | 2017095817 | 6/2017 |

\* cited by examiner

*Primary Examiner* — Marin Pichler
(74) *Attorney, Agent, or Firm* — Robert C. Kowert; Kowert, Hood, Munyon, Rankin & Goetzel, P.C.

(57) ABSTRACT

Some embodiments of a mirror tilt actuator include a chassis, one or more magnetic yoke structures affixed to the chassis, and a carriage moveably mounted to the chassis. In some embodiments, the chassis includes an indentation for affixing one or more magnetic yoke structures, and the chassis further includes one or more bearing receivers for mounting a mirror carriage. In some embodiments, the carriage includes one or more bearing members. In some embodiments, the one or more bearing members rest in one or more respective bearing receivers of the chassis. In some embodiments, the one or more edge members terminate in one or more curved leading edge faces. Some embodiments further include a magnet fixedly mounted to the carriage, a magnetic coil wrapped around a coil shaft mounted to the chassis.

20 Claims, 13 Drawing Sheets

US 10,725,288 B1

MIRROR TILT ACTUATOR AND BEARING FOR OPTICAL SYSTEM

This application claims benefit of priority to U.S. Provisional Patent Application Ser. No. 62/261,113, filed Nov. 30, 2015, which is hereby incorporated by reference in its entirety.

BACKGROUND

Technical Field

This disclosure relates generally to image acquisition systems, and, more specifically, to mirror tilt actuators for image acquisition systems.

Description of the Related Art

Miniature cameras, such as those typically used in mobile devices such as cellphones and other multifunction devices, could provide additional functions to the user if mirror tilt actuators could be easily employed.

In such devices, however, space is a premium and every effort is made to minimize the camera size.

SUMMARY OF EMBODIMENTS

Some embodiments of a mirror tilt actuator include a chassis, one or more magnetic yoke structures affixed to the chassis, and a carriage moveably mounted to the chassis. In some embodiments, the chassis includes an indentation for affixing one or more magnetic yoke structures, and the chassis further includes one or more bearing receivers for mounting a mirror carriage. In some embodiments, the carriage includes one or more bearing members. In some embodiments, the one or more bearing members rest in one or more respective bearing receivers of the chassis. In some embodiments, the one or more edge members terminate in one or more curved leading edge faces. Some embodiments further include a magnet fixedly mounted to the carriage, a magnetic coil wrapped around a coil shaft mounted to the chassis.

Figure 1:
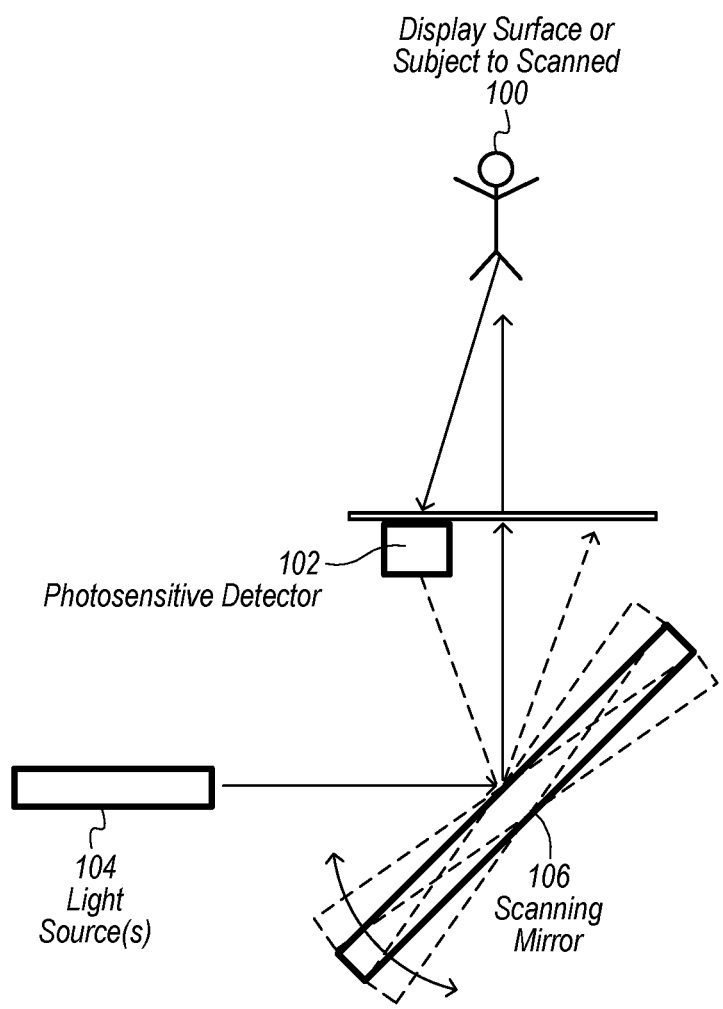
FIG. 1 depicts components of an image acquisition system for use in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments of a mirror tilt actuator include a chassis, one or more magnetic yoke structures affixed to the chassis, and a carriage moveably mounted to the chassis. In some embodiments, the chassis includes an indentation for affixing one or more magnetic yoke structures, and the chassis further includes one or more bearing receivers for mounting a mirror carriage. In some embodiments, the carriage includes one or more bearing members. In some embodiments, the one or more bearing members rest in one or more respective bearing receivers of the chassis. In some embodiments, the one or more edge members terminate in one or more curved leading edge faces. Some embodiments further include a magnet fixedly mounted to the carriage, a magnetic coil wrapped around a coil shaft mounted to the chassis.

In some embodiments, the one or more bearing members allow reciprocating angular motion of the carriage by rolling on the one or more respective bearing receivers of the chassis under torque from the magnet and coil while restrained by the yoke and chassis.

Some embodiments further include one or more sensors for detecting a position of a mirror attached to the mirror tilt actuator.

Some embodiments further include one or more electrically conductive spring flexures for conducting signals from a mirror unit mounted in the carriage to a processor for controlling the mirror unit.

In some embodiments, the one or more magnetic yoke structures further include a pair of symmetric magnetic yolk structures for mounting respective ends of a coil shaft, and the one or more magnetic yoke structures include respective concave tapered end members complementary to a curvature of the magnet.

In some embodiments, the one or more bearing members further include knife edge bearing members further including an angled blade portion terminating in a rounded edge portion.

In some embodiments, a mirror tilt actuator includes a chassis fixedly mounted to a base component, a carriage moveably mounted to the chassis, and a magnet fixedly mounted to the carriage, and a magnetic coil mounted to the chassis.

Some embodiments further include one or more magnetic yoke structures affixed to the chassis.

In some embodiments, the chassis includes an indentation for affixing one or more magnetic yoke structures, and the chassis further includes a bearing receiver for mounting a mirror carriage. In some embodiments, the carriage includes one or more bearing members at a first end and a basket member at a second end, and the edge member rests in a bearing receiver of the chassis.

In some embodiments, the carriage further includes a flexible member mounted between the basket and the one or more bearing members, and the basket is cantilevered with respect to the one or more bearing members.

Some embodiments further include a photon emitter for directing photons onto the basket, and one or more photon detectors for detecting a position of a mirror attached to the mirror tilt actuator by measuring photons reflected off of the basket after emission from the emitter.

Some embodiments further include a cap member, affixed to the chassis, for regulating motion of the carriage.

In some embodiments, the base member includes a printed circuit board having an indentation for permitting motion of the carriage.

In some embodiments, the chassis includes an indentation for permitting motion of the carriage.

In some embodiments, the bearing member includes a rounded edge member terminated in a curved leading edge face having a radius of curvature less than a radius of curvature of the bearing receiver.

In some embodiments, a mirror tilt actuator includes a chassis, one or more magnetic yoke structures affixed to the chassis, a carriage moveably mounted to the chassis, a magnet fixedly mounted to the carriage, and a magnetic coil mounted to the chassis.

In some embodiments, the chassis includes an indentation for affixing one or more magnetic yoke structures, and the chassis further includes a plurality of bearing receivers for mounting a mirror carriage. In some embodiments, the carriage includes a plurality of bearing members, the plurality of bearing members rest in respective bearing receivers of the chassis, and the carriage includes a mirror basket mounted between the bearing members.

In some embodiments, the bearing members include knife edge bearing members terminated in faces each having an external dimension less than an internal dimension of a respective one of the bearing receivers.

Some embodiments further include one or more capacitive sensors arranged at opposite sides of the carriage for detecting an angular displacement of a mirror attached to the mirror tilt actuator.

Some embodiments further include one or more flexible conductor members for conducting signals from a mirror unit mounted in the carriage to a processor for controlling the mirror unit.

In some embodiments, the one or more magnetic yoke structures include respective concave tapered end members complementary to a curvature of the magnet.

In some embodiments, the one or more bearing members include one or more knife edge bearing members further includincluding an angled blade portion.

Some embodiments further include one or more conductive springs for conducting instructions to a mirror unit mounted in the carriage to a processor for controlling the mirror unit.

Some embodiments of a mirror tilt actuator include a chassis, one or more magnetic yoke structures affixed to the chassis, and a carriage moveably mounted to the chassis. In some embodiments, the chassis includes an indentation for affixing the one or more magnetic yoke structures. In some embodiments, the chassis further includes one or more bearing receivers for mounting a mirror carriage.

In some embodiments, the magnetic yoke structures include a notch for mounting a magnetic coil shaft. In some embodiments, the carriage includes one or more knife edge bearing members. In some embodiments, the one or more edge members rest in one or more respective bearing receivers of the chassis. In some embodiments, the one or more edge members terminate in one or more curved leading edge faces each having a radius of curvature less than a radius of curvature of a respective one of the bearing receivers.

Some embodiments further include a magnet fixedly mounted to the carriage, and a magnetic coil wrapped around the coil shaft. In some embodiments, the shaft is affixed in the notch.

In some embodiments, the one or more knife edge bearing members allow reciprocating angular motion of the carriage by rolling on the one or more respective bearing receivers of the chassis under torque from the magnet and coil while restrained by the yoke and chassis. Some embodiments further include one or more sensors for detecting a position of a mirror attached to the mirror tilt actuator.

Some embodiments further include one or more electrically conductive spring flexures for conducting signals from a mirror unit mounted in the carriage to a processor for controlling the mirror unit.

In some embodiments, the one or more magnetic yoke structures affixed to the chassis further include a pair of symmetric magnetic yolk structures for mounting respective ends of the coil shaft, and the one or more magnetic yoke structures affixed to the chassis include respective concave tapered end members complementary to a curvature of the magnet.

In some embodiments, the one or more knife edge bearing members further include an angled blade portion terminating in a rounded edge portion.

Some embodiments of a mirror tilt actuator include a chassis fixedly mounted to a base component, one or more magnetic yoke structures affixed to the chassis, and a carriage moveably mounted to the chassis. In some embodiments, the chassis includes an indentation for affixing one or more magnetic yoke structures, and the chassis further includes a bearing receiver for mounting a mirror carriage. In some embodiments, the magnetic yoke structures include one or more notches for mounting a magnetic coil shaft.

In some embodiments, the carriage includes a rounded knife edge bearing members at a first end and a basket member at a second end. In some embodiments, the edge member rests in a bearing receiver of the chassis. Some embodiments further include a magnet fixedly mounted to the carriage, and a magnetic coil wrapped around the coil shaft, wherein the shaft is affixed in the notch.

In some embodiments, the carriage includes a flexible member mounted between the basket and the rounded knife-edge bearing, wherein the basket is cantilevered with respect to the bearing.

In some embodiments, the actuator includes a photon emitter for directing photons onto the basket, and one or more photon detectors for detecting a position of a mirror attached to the mirror tilt actuator by measuring photons reflected off of the basket after emission from the emitter.

In some embodiments, the actuator includes a cap member, affixed to the chassis, for regulating motion of the carriage. In some embodiments, the base member includes a printed circuit board having an indentation for permitting motion of the carriage.

In some embodiments, the chassis includes an indentation for permitting motion of the carriage.

In some embodiments, the rounded edge member terminates in a curved leading edge face having a radius of curvature less than a radius of curvature of the bearing receiver.

Some embodiments of a mirror tilt actuator include a chassis, one or more magnetic yoke structures affixed to the chassis, and a carriage moveably mounted to the chassis.

In some embodiments, the chassis includes an indentation for affixing one or more magnetic yoke structures, and the chassis further includes a plurality of mounting locations for mounting a mirror carriage. In some embodiments, the magnetic yoke structures include a notch for mounting a magnetic coil shaft.

In some embodiments, the carriage includes a plurality of knife edge bearing members. In some embodiments, the plurality of knife edge bearing members rest in respective mounting locations of the chassis, and the carriage includes a mirror basket mounted between the knife edge bearing members. Some embodiments further include a magnet fixedly mounted to the carriage, and a magnetic coil wrapped around the coil shaft. In some embodiments, the shaft is affixed in the notch.

In some embodiments, the knife edge bearing members terminate in faces each having an external dimension less than an internal dimension of a respective one of the mounting locations.

Some embodiments further include one or more capacitive sensors arranged at opposite sides of the carriage for detecting an angular displacement of a mirror attached to the mirror tilt actuator.

Some embodiments further include one or more flexible conductor members for conducting signals from a mirror unit mounted in the carriage to a processor for controlling the mirror unit.

In some embodiments, the one or more magnetic yoke structures affixed to the chassis include respective concave tapered end members complementary to a curvature of the magnet.

In some embodiments, the one or more knife edge bearing members further include an angled blade portion.

Some embodiments further include one or more conductive springs for conducting instructions to a mirror unit mounted in the carriage to a processor for controlling the mirror unit.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In some embodiments, the device is an appliance, vehicle, or other consumer product.

A camera device package, which is one embodiment of a camera system, includes a housing of an actuator and a mirror assembly. In some embodiments, a sensor (and in some embodiments light source for emitting light to illuminate objects in a scene subject to image acquisition), is fixedly mounted to the housing. In some embodiments, a mirror tilt actuator, fixedly mounted to the housing is contained within actuator and mirror assembly, for tilting a mirror fixedly mounted to the mirror tilt actuator within actuator and mirror assembly. In some embodiments, a mirror fixedly mounted to the mirror tilt actuator within actuator and mirror assembly, is used for reflecting light. In some embodiments, cover glass is included.

Actuator Embodiments

FIG. 1 depicts operation of an illuminated image acquisition system for use in accordance with some embodiments. Some embodiments function by reflecting light from a light source into a subject scene, such as display surface or subject to be scanned 100 and receiving the light at a detector 102 for measurement of the light. A housing, which is omitted for simplicity in FIG. 1, contains a light source 104, a scanning mirror 106 coupled to an actuator (not shown), and a photosensitive detector 102.

Some embodiments include a light source 104 for emitting light to illuminate objects in a scene, and the light source is fixedly mounted to the housing (not shown). Some embodiments include a mirror tilt actuator (not shown), fixedly mounted to the housing (not shown), for tilting mirror 106, and mirror 106 is fixedly mounted to the mirror tilt actuator (not shown). In some embodiments, mirror 106 is fixedly mounted to the mirror tilt actuator (not shown), for reflecting light from the light source 104 to the objects 100. Some embodiments include a photosensitive detector 102 in the path of the light from the mirror to the objects. In some embodiments, photosensitive detector 102 detects light returned from the objects 100.

Figure 2:
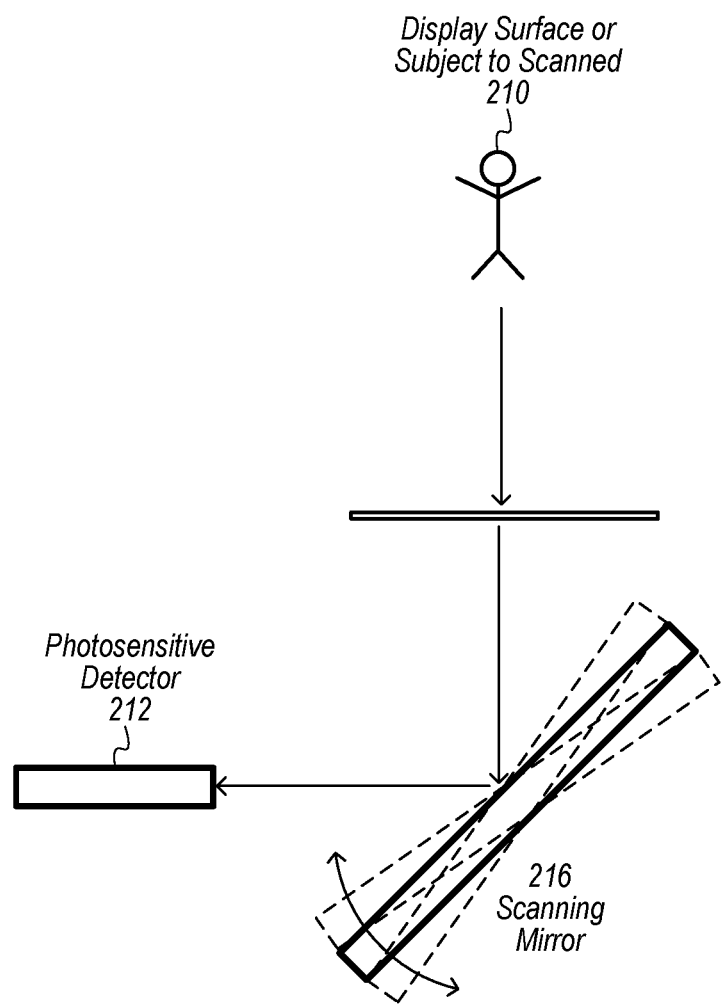
FIG. 2 illustrates components of an image acquisition system for use in accordance with some embodiments.

FIG. 2 depicts operation of an ambient light image acquisition system for use in accordance with some embodiments. Some embodiments function by reflecting light from a subject scene, such as display surface or subject to be scanned 210 and receiving the light at a detector 212 for measurement of the light. A housing, which is omitted for simplicity in FIG. 2B, contains a mirror 216 coupled to an actuator (not shown), and a photosensitive detector 212.

Some embodiments include a mirror tilt actuator (not shown), fixedly mounted to the housing (not shown), for tilting mirror 216, and mirror 216 is fixedly mounted to the mirror tilt actuator (not shown). In some embodiments, photosensitive detector 212 detects light returned from the objects 210.

Figure 3A:
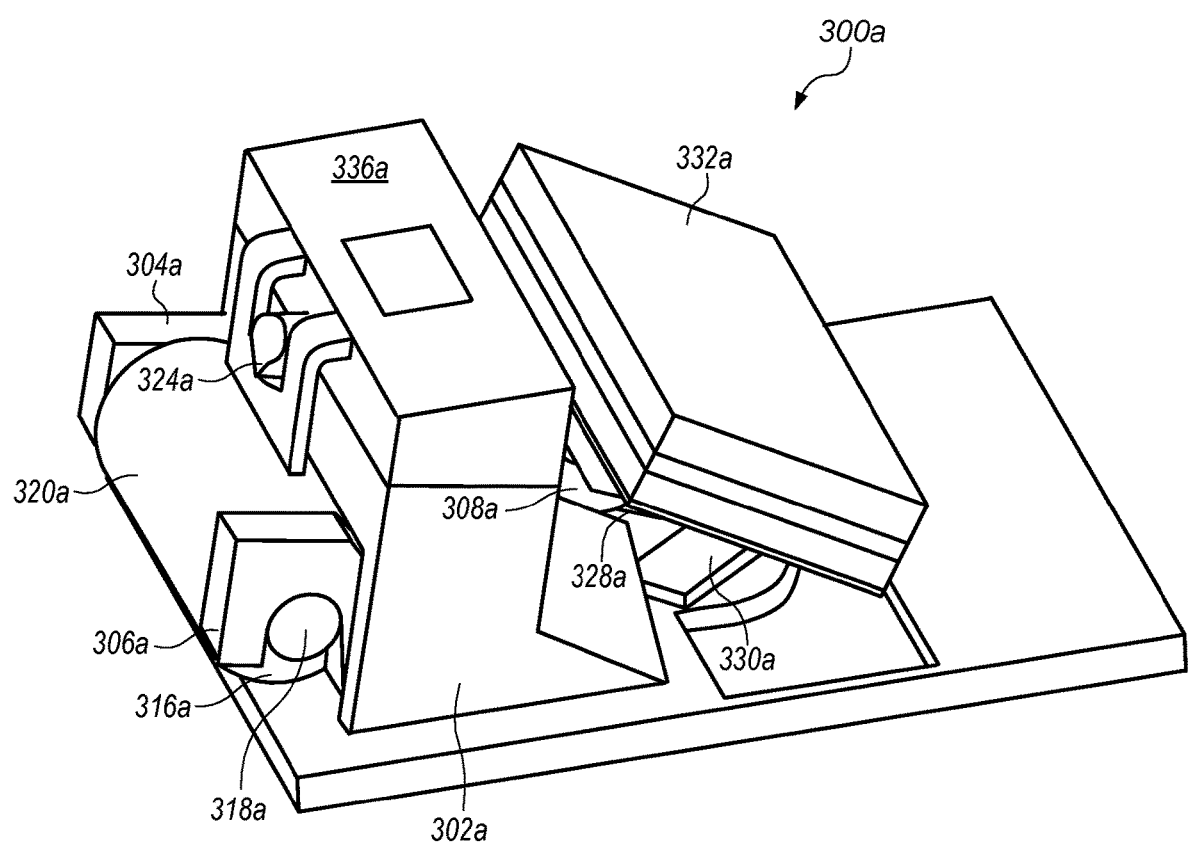
FIGS. 3A-C depict a mirror tilt actuator for use with an image acquisition system for use in accordance with some embodiments.
Figure 3B:
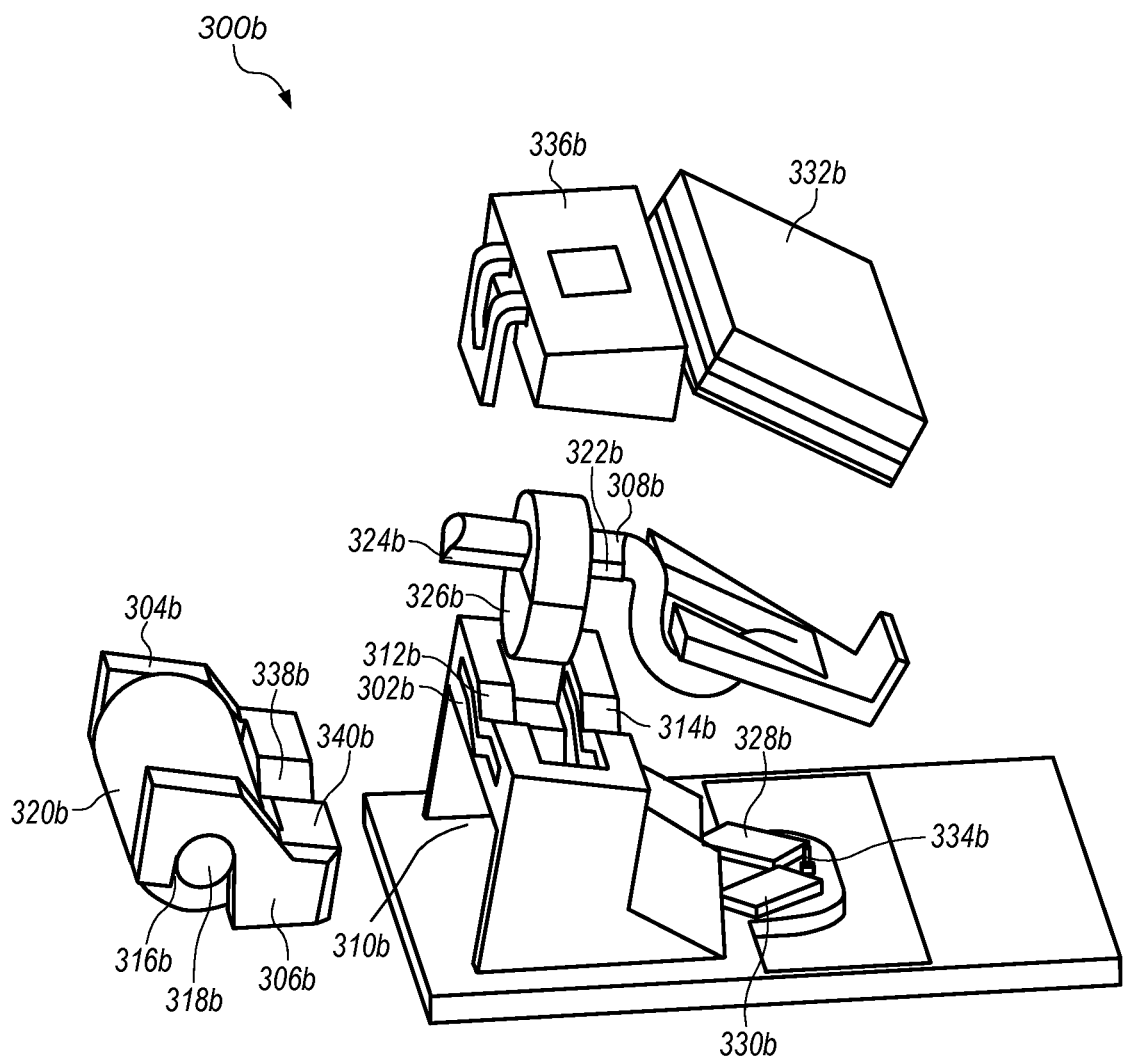
Figure 3C:
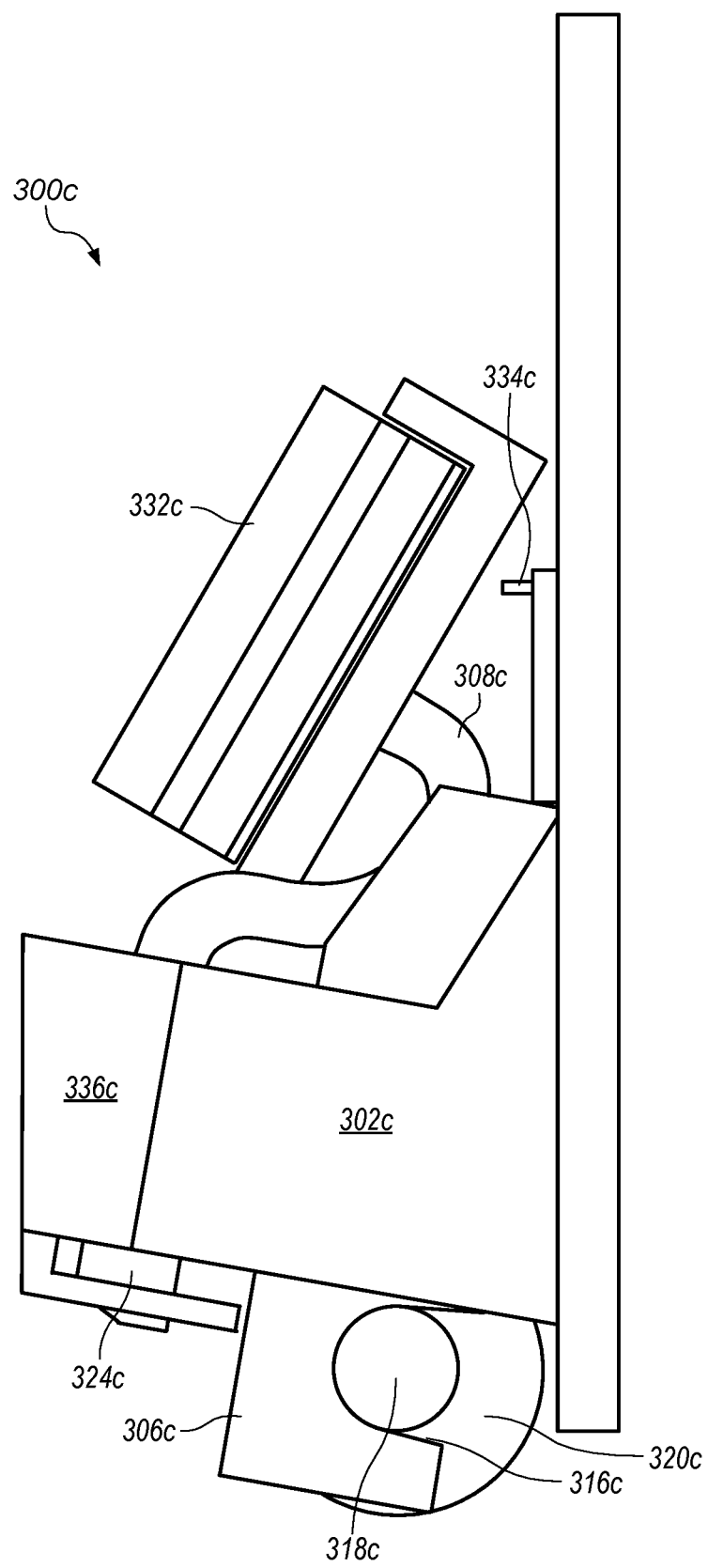

FIGS. 3A-C depict a mirror tilt actuator for use with an image acquisition system for use in accordance with some embodiments. Some embodiments of a mirror tilt actuator 300a-c include a chassis 302a-c, one or more magnetic yoke structures 304a-306c affixed to the chassis 302a, and a mirror carriage 308a-c moveably mounted to the chassis 302a-c. In some embodiments, the chassis 302a-c includes an indentation 310b for affixing the one or more magnetic yoke structures 304a-306c. In some embodiments, the chassis 302a-c further includes one or more bearing receivers 312b-314b for mounting a mirror carriage 308.

In some embodiments, the magnetic yoke structures 304a-306c each include a notch 316a-c for mounting a magnetic coil shaft 318a-c supporting a magnetic coil 320a-c. In some embodiments, the carriage 308a-308c includes one or more knife edge bearing members 322b-324c. In some embodiments, the one or more edge members 322b-324c rest in one or more respective bearing receivers 312b-314b of the chassis 302a-c. In some embodiments, the one or more edge members 322b-324c terminate in one or more curved leading edge faces each having a radius of curvature less than a radius of curvature of a respective one of the bearing receivers 312b-314b.

Some embodiments further include a magnet 326b fixedly mounted to the carriage 308a-c, and a magnetic coil 320a-c wrapped around the coil shaft 318a-c. In some embodiments, the shaft 318a-c is affixed in the notch 316a-c.

In some embodiments, the one or more knife edge bearing members 322b-324c allow reciprocating angular motion of the carriage 308a-308c by rolling on the one or more respective bearing receivers 312b-314b of the chassis 302a-c under torque from the magnet 326b and coil 320a-c while restrained by the yoke 304a-306c, a top cap 336a-c, and chassis 302a-c. Some embodiments further include one or more sensors 328a-330c for detecting a position of a mirror or a mirror assembly 332a-c attached to the mirror tilt actuator 300a-c by detecting signals reflected from carriage 308a-c from an emitter 334b-c.

Some embodiments further include one or more electrically conductive spring flexures (not visible in FIGS. 3A-3C, see FIG. 6A) for conducting signals from a mirror unit 332a-c mounted in the carriage 308a-c to a processor for controlling the mirror unit 332a-c.

In some embodiments, the one or more magnetic yoke structures 304a-306c affixed to the chassis 302a-c further include a pair of symmetric magnetic yoke structures 304a-306c for mounting respective ends of the coil shaft 318a-c, and the one or more magnetic yoke structures 304a-306c affixed to the chassis 302a-c include respective concave tapered end members 338b-340b complementary to a curvature of the magnet.

Figure 4A:
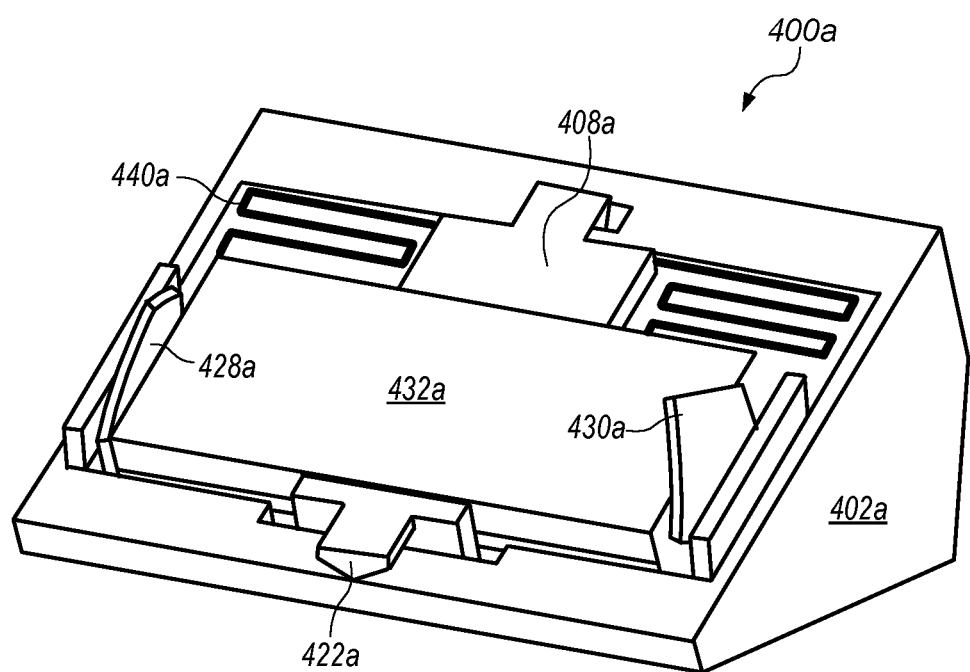
FIGS. 4A-C illustrate a mirror tilt actuator for use with an image acquisition system for use in accordance with some embodiments.
Figure 4B:
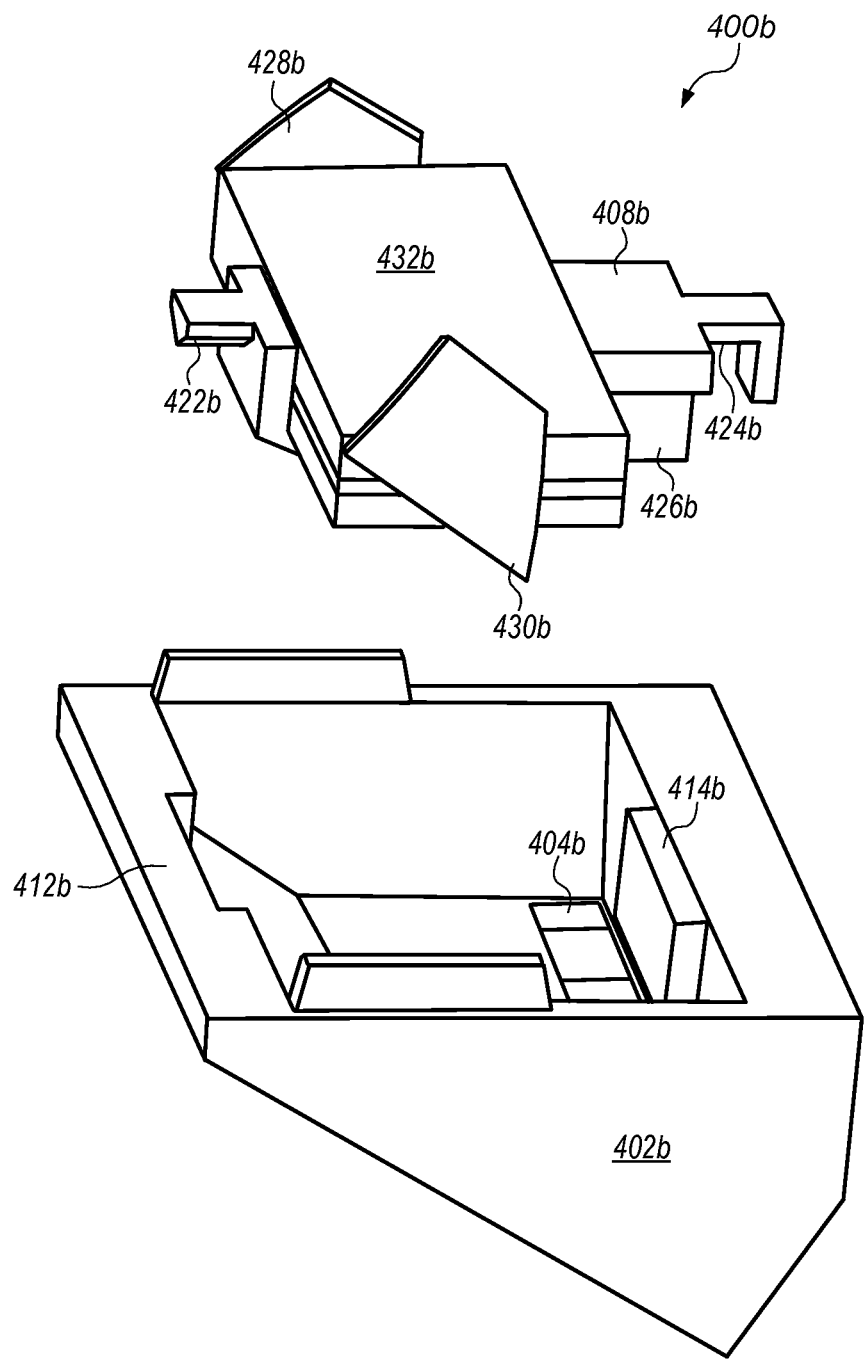
Figure 4C:
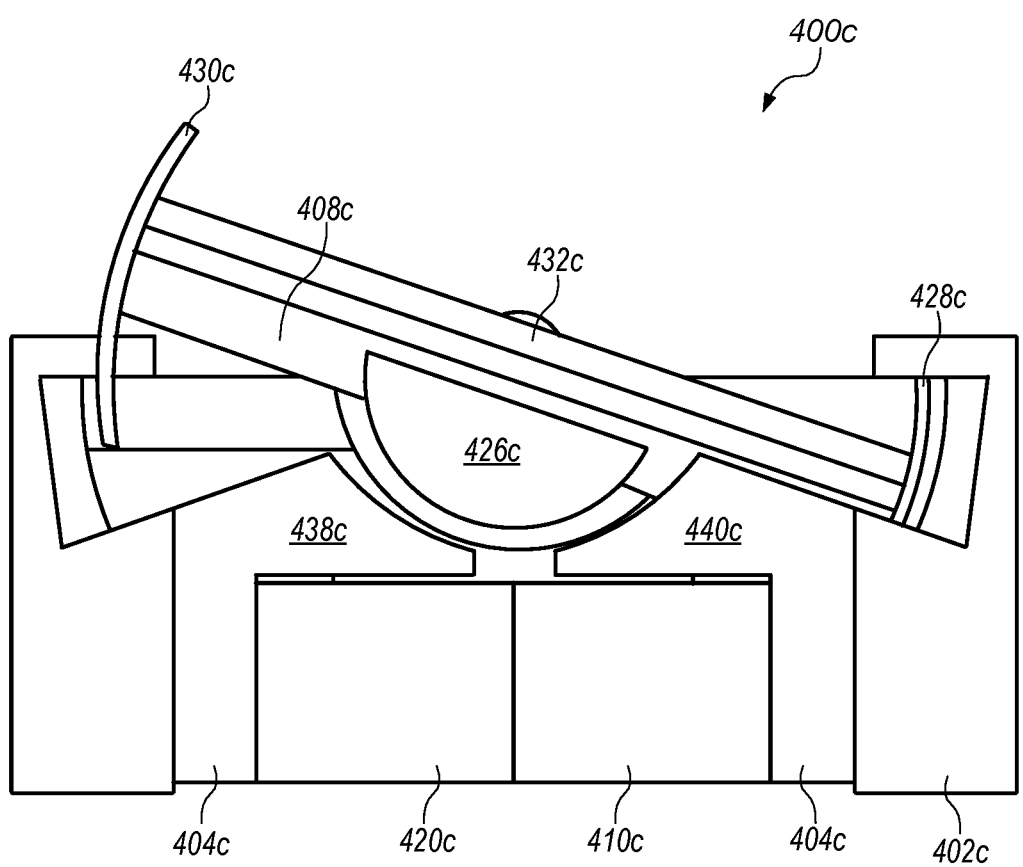

In some embodiments, the one or more knife edge bearing members 322b-324c further include an angled blade portion terminating in a rounded edge portion FIGS. 4A-C illustrate a mirror tilt actuator for use with an image acquisition system for use in accordance with some embodiments. Some embodiments of a mirror tilt actuator 400a-c include a chassis 402a-c, one or more magnetic yoke structures 404b-404c affixed to the chassis 402a-c, and a carriage 408a-c moveably mounted to the chassis 402a-c.

In some embodiments, the chassis 402a-c includes an indentation for affixing one or more magnetic yoke structures 404b-404c, and the chassis 402a further includes a plurality of mounting locations 412b-414b for mounting a mirror carriage 408a-c.

In some embodiments, the carriage 408a-c includes a plurality of knife edge bearing members 424a-424b. In some embodiments, the plurality of knife edge bearing members 424a-424b rest in respective mounting locations 412b-414b of the chassis 402a-c, and the carriage 408a-c includes a mirror basket mounted between the knife edge bearing members 424a-424b for mounting a mirror 432a-c. Some embodiments further include a magnet 426b-c fixedly mounted to the carriage 408a-c, and a magnetic coil 410c and 420c wrapped around a coil shaft mounted to a notch in the yoke structures 408a-c. In some embodiments, the shaft is affixed in the notch.

In some embodiments, the knife edge bearing members 422b-424b terminate in faces each having an external dimension less than an internal dimension of a respective one of the mounting locations.

Some embodiments further include one or more capacitive sensors 428a-430c arranged at opposite sides of the carriage 408a-408c for detecting an angular displacement of a mirror 432a-432c attached to the mirror tilt actuator 400a-400c.

Some embodiments further include one or more flexible conductor members 440a for conducting signals from a mirror unit mounted in the carriage to a processor for controlling the mirror unit.

In some embodiments, the one or more magnetic yoke structures 404a-404c affixed to the chassis 402a-402c include respective concave tapered end members 438c-440c complementary to a curvature of the magnet 426c.

In some embodiments, the one or more knife edge bearing members further include an angled blade portion 422a-424b.

Some embodiments further include one or more conductive springs 440a for conducting instructions to a mirror unit 432a-c mounted in the carriage 408a-c to a processor for controlling the mirror unit 432a-c.

Figure 5A:
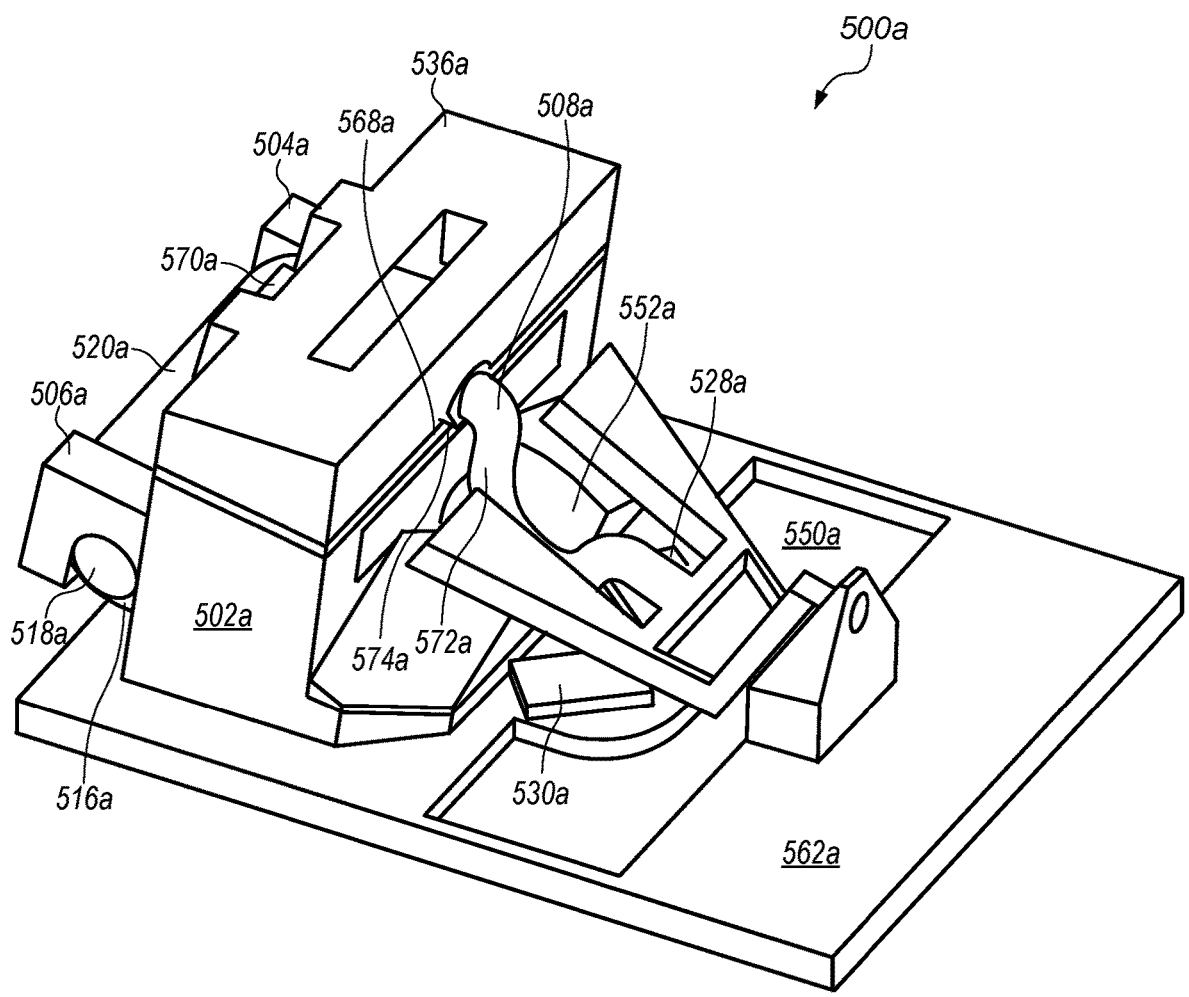
FIG. 5A depicts a mirror tilt actuator for use with an image acquisition system for use in accordance with some embodiments.

FIG. 5A depicts a mirror tilt actuator for use with an image acquisition system for use in accordance with some embodiments. Some embodiments of a mirror tilt actuator 500a include a chassis 502a fixedly mounted to a base component 562a, one or more magnetic yoke structures 504a-506a affixed to the chassis 502a, and a carriage 508a moveably mounted to the chassis 502a. In some embodiments, the chassis 502a includes an indentation for affixing one or more magnetic yoke structures 504a-506a, and the chassis 502a further includes a bearing receiver 568a for mounting the mirror carriage 508a. In some embodiments, the magnetic yoke structures 504a-506a include one or more notches 516a for mounting a magnetic coil shaft 518a.

In some embodiments, the carriage 508a includes one or more rounded knife edge bearing members 574a at a first end or portion and a basket member 572a at a second end or portion opposite to the first end 570a. In some embodiments, the edge member rests in a bearing receiver 568a of the chassis 502a. In some embodiments, the carriage 508a may include a bearing receiver 532a for a bearing member may rest. Some embodiments further include a magnet fixedly mounted to the carriage 508a, and a magnetic coil 520a wrapped around the coil 518a shaft, wherein the shaft 518a is affixed in the notch 516a. Some embodiments include a top cap 536a. Some embodiments include one or more sensors (e.g., sensors 528a and 530a) for detecting a position of a mirror or a mirror assembly attached to the mirror tilt actuator 500a by detecting signals reflected from carriage 508a from an emitter. In some embodiments, the chassis 502a includes an indentation 552a for permitting motion of the carriage 508a. In some embodiments, the base component 562a includes a printed circuit board having an indentation 550a for permitting motion of the carriage 508a. In some embodiments, the carriage 508a may have an indentation 566a.

Figure 5B:
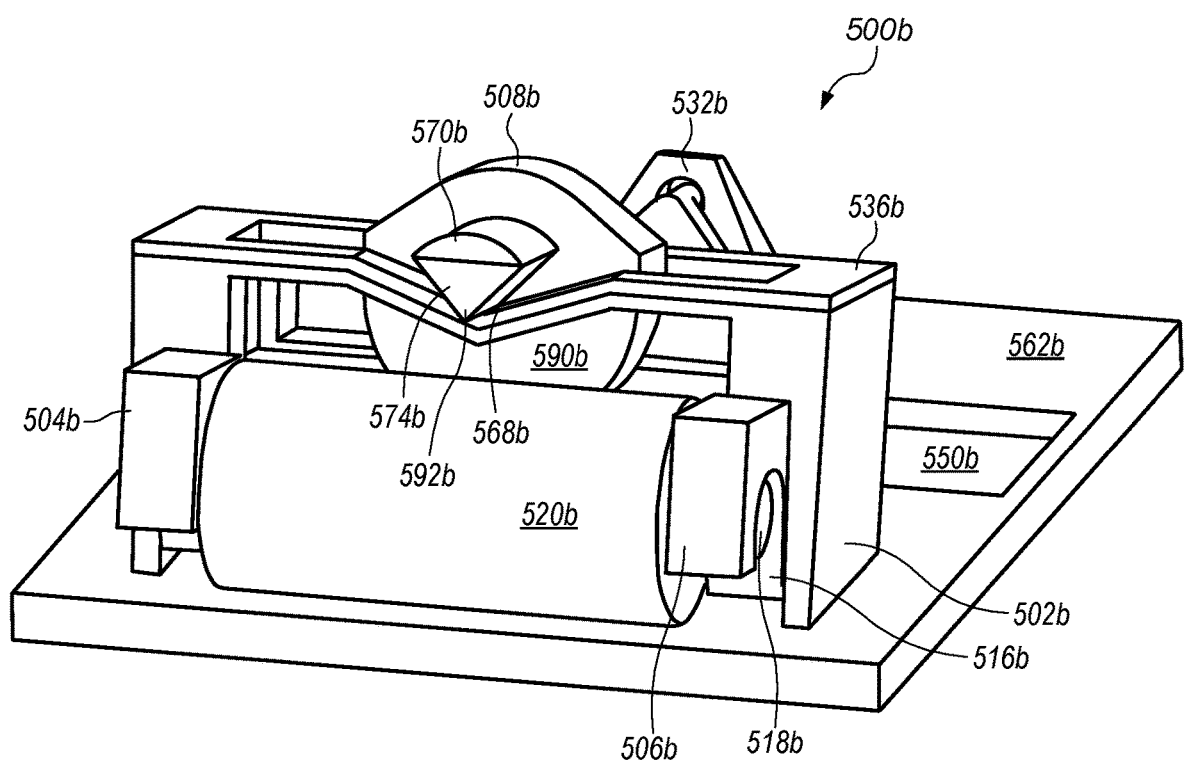
FIG. 5B depicts a relationship between a rounded knife edge bearing member and a receiver.

FIG. 5B depicts a mirror tilt actuator for use with an image acquisition system for use in accordance with some embodiments.

Some embodiments of a mirror tilt actuator 500b include a chassis 502b fixedly mounted to a base component 562b, one or more magnetic yoke structures 504b-506b affixed to the chassis 502b, and a carriage 508b moveably mounted to the chassis 502b. In some embodiments, the chassis 502b includes an indentation for affixing one or more magnetic yoke structures 504b-506b, and the chassis 502b further includes a bearing receiver 568b for mounting the mirror carriage 508b. In some embodiments, the magnetic yoke structures 504b-506b include one or more notches 516b for mounting a magnetic coil shaft 518b.

In some embodiments, the carriage 508b includes one or more rounded knife edge bearing members 574b. In some embodiments, the edge member 574b rests in a bearing receiver 568b of the chassis 502b. In some embodiments, the carriage 508b may include a bearing receiver 532b for a bearing member. Some embodiments further include a magnet 590b fixedly mounted to the carriage 508b, and a magnetic coil 520b wrapped around the coil 518b shaft, wherein the shaft 518b is affixed in the notch 516b.

In some embodiments, the knife edge bearing members 570b include wedge members 574b that terminate in rounded faces 592b each having an external dimension less than an internal dimension of a respective one of the mounting locations 568b. Some embodiments include a top cap 536b. In some embodiments, the base component 562b includes a printed circuit board having an indentation 550b for permitting motion of the carriage 508b.

Example Operations

Figure 6:
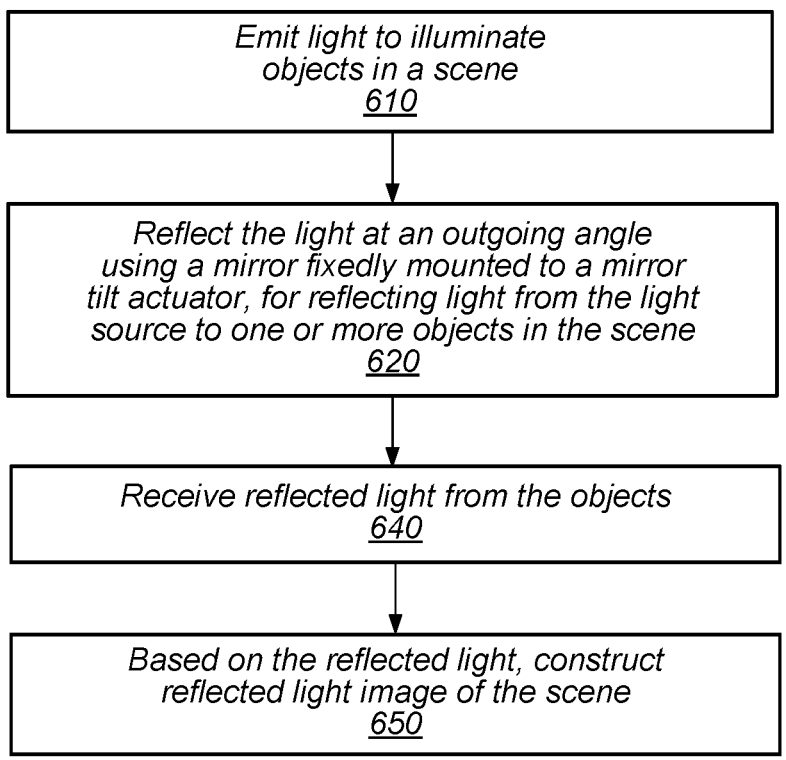
FIG. 6-7 are flowcharts of methods for operating a mirror tilt actuator in accordance with some embodiments.

FIG. 6 is a flowchart of a method for operating a mirror tilt actuator in accordance with some embodiments. A light source emits light to illuminate objects in a scene (610). The light is reflected at an outgoing angle using a mirror fixedly mounted to a mirror tilt actuator, for reflecting light from the light source to one or more objects in the scene (620). A detector mounted within the housing receives reflected light from the objects (640). Based on the reflected light, a reflected light image of the scene is constructed (650).

Figure 7:
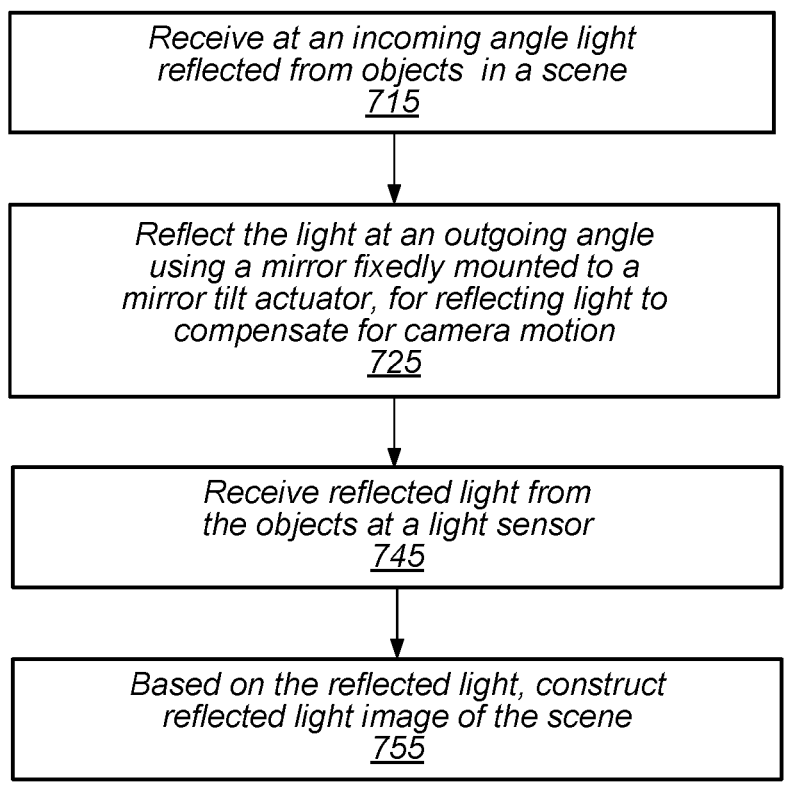

FIG. 7 is a flowchart of a method for operating a mirror tilt actuator in accordance with some embodiments. Light is received at an incoming angle from objects in a scene (715). The light is reflected at an outgoing angle using a mirror fixedly mounted to a mirror tilt actuator, for reflecting light to compensate for camera motion (725). A detector mounted within the housing receives reflected light from the objects (745). Based on the reflected light, a reflected light image of the scene is constructed (755).

Example Computer System

Figure 8:
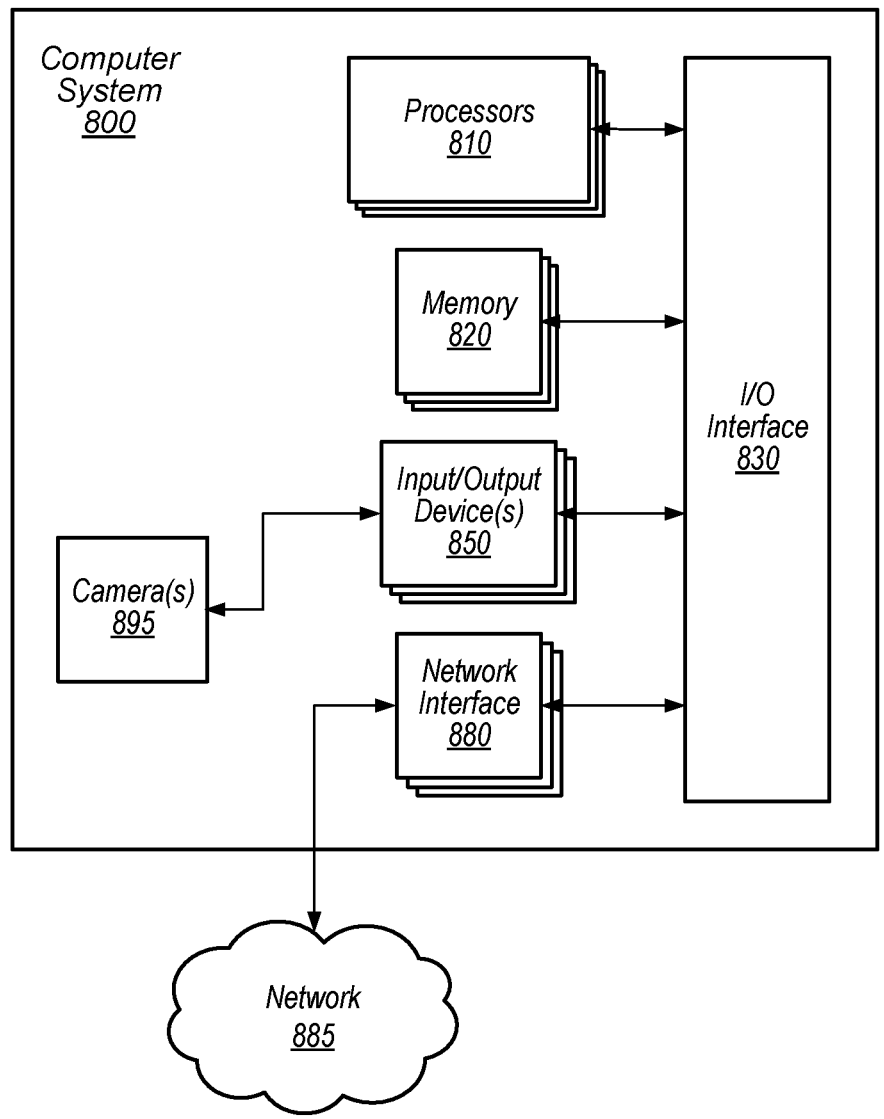
FIG. 8 illustrates an example computer system configured to implement aspects of the system and method for image acquisition using a mirror tilt actuator.

FIG. 8 illustrates an example computer system 800 that may be configured to include or execute any or all of the embodiments described above. In different embodiments, computer system 800 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a vehicle computer, a mobile device, a consumer device, video game console, handheld video game device, application server, storage device, a television, a video recording device, a peripheral device such as a switch, modem, router, or in general any type of computing or electronic device.

Various embodiments of an audio communication system, talker feedback system, some combination thereof, etc., as described herein, may be executed in one or more computer systems 800, which may interact with various other devices. Note that any component, action, or functionality described above with respect to FIGS. 1 through 3 may be implemented on one or more computers configured as computer system 800 of FIG. 8, according to various embodiments. In the illustrated embodiment, computer system 800 includes one or more processors 810 coupled to a system memory 820 via an input/output (I/O) interface 830. Computer system 800 further includes a network interface 880 coupled to I/O interface 830, and one or more input/output devices, which can include one or more user interface (also referred to as "input interface") devices and one or more cameras 895 that can employ actuators as disclosed herein. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store program instructions, data, etc. accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 820 may be configured to implement some or all of an ANS, incorporating any of the functionality described above. Additionally, existing control data of memory 820 may include any of the information or data structures described above. In some embodiments, program instructions and/or data may be received, sent or stored upon different types of computer-accessible media or on similar media separate from system memory 820 or computer system 800. While computer system 800 is described as implementing the functionality of functional blocks of previous Figures, any of the functionality described herein may be implemented via such a computer system.

In one embodiment, I/O interface 830 may be configured to coordinate I/O traffic between processor 810, system memory 820, and any peripheral devices in the device, including network interface 880 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 880 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 880 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 800. Multiple input/output devices may be present in computer system 800 or may be distributed on various nodes of computer system 800. In some embodiments, similar input/output devices may be separate from computer system 800 and may interact with one or more nodes of computer system 800 through a wired or wireless connection, such as over network interface 880.

Memory 820 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A mirror tilt actuator, comprising:
    a chassis, comprising:
        an indentation, and
        one or more bearing receivers;
    one or more yoke structures affixed to the chassis via the indentation;
    a carriage, moveably mounted to the chassis, wherein:
        the carriage comprises one or more bearing members that are moveable relative to the chassis, and
        at least one of the one or more bearing members comprises a convex leading edge in contact with at least one surface of at least one of the one or more bearing receivers of the chassis, wherein the convex leading edge is configured to move on the at least one surface;
    a magnet fixedly mounted to the carriage; and
    a coil wrapped around a coil shaft mounted to the chassis via the one or more yoke structures.

2. The mirror tilt actuator of claim 1, wherein:
    the one or more bearing members allow reciprocating angular motion of the carriage by rolling on the one or more bearing receivers of the chassis under torque from the magnet and the coil while restrained by the one or more yoke structures and the chassis.

3. The mirror tilt actuator of claim 1, further comprising:
    one or more sensors for detecting a position of a mirror attached to the mirror tilt actuator.

4. The mirror tilt actuator of claim 1, further comprising:
    one or more electrically conductive spring flexures for conducting signals from a mirror unit mounted in the carriage to a processor for controlling the mirror unit.

5. The mirror tilt actuator of claim 1, wherein:
    the one or more yoke structures further comprise a pair of symmetric yoke structures for mounting respective ends of the coil shaft; and
    the one or more yoke structures comprise respective concave tapered end members complementary to a curvature of the magnet.

6. The mirror tilt actuator of claim 1, wherein:
    the one or more bearing members comprise one or more knife edge bearing members that comprise an angled blade portion terminating in a rounded edge portion.

7. A mirror tilt actuator, comprising:
    a chassis fixedly mounted to a base component, wherein the chassis comprises:
        an indentation, and
        a bearing receiver;
    one or more yoke structures affixed to the chassis via the indentation;
    a carriage, moveably mounted to the chassis, wherein:
        the carriage comprises a bearing member and a basket member, and
        the bearing member comprises a convex edge that rests on a surface of the bearing receiver of the chassis, wherein the convex edge is configured to roll on the surface of the bearing receiver so that the bearing member is moveable relative to the chassis;
    a magnet fixedly mounted to the carriage; and
    a coil mounted to the chassis via the one or more yoke structures.

8. The mirror tilt actuator of claim 7, wherein the carriage further comprises:
    a flexible member mounted between the basket and the bearing member, wherein the basket is cantilevered with respect to the bearing member.

9. The mirror tilt actuator of claim 7, further comprising:
    a photon emitter for directing photons onto the basket; and
    one or more photon detectors for detecting a position of a mirror attached to the mirror tilt actuator by measuring photons reflected off of the basket after emission from the emitter.

10. The mirror tilt actuator of claim 7, further comprising:
    a cap member, affixed to the chassis, for regulating motion of the carriage.

11. The mirror tilt actuator of claim 7, wherein the base member comprises:
    a printed circuit board having an indentation for permitting motion of the carriage.

12. The mirror tilt actuator of claim 7, wherein the chassis comprises:
    another indentation for permitting motion of the carriage.

13. The mirror tilt actuator of claim 7, wherein:
the bearing member comprises a rounded edge member terminated in a curved leading edge having a radius of curvature less than a radius of curvature of the bearing receiver.

14. A mirror tilt actuator, comprising:
a chassis, comprising:
   an indentation, and
   one or more bearing receivers;
one or more yoke structures affixed to the chassis;
a carriage, moveably mounted to the chassis, wherein:
   the carriage comprises one or more bearing members,
   a bearing member of the one or more bearing members comprises a convex edge that moveably rests on at least one surface of a bearing receiver of the one or more bearing receivers so that the bearing member is moveable relative to the chassis, and
   the carriage comprises a mirror basket;
a magnet fixedly mounted to the carriage; and
a coil mounted to the chassis via the one or more yoke structures.

15. The mirror tilt actuator of claim 14, wherein:
the one or more bearing members comprise one or more knife edge bearing members terminated in one or more respective faces each having an external dimension less than an internal dimension of a respective one of the one or more bearing receivers.

16. The mirror tilt actuator of claim 14, further comprising:
one or more capacitive sensors arranged at opposite sides of the carriage for detecting an angular displacement of a mirror attached to the mirror tilt actuator.

17. The mirror tilt actuator of claim 14, further comprising:
one or more flexible conductor members for conducting signals from a mirror unit mounted in the carriage to a processor for controlling the mirror unit.

18. The mirror tilt actuator of claim 14, wherein:
the one or more yoke structures comprise respective concave tapered end members complementary to a curvature of the magnet.

19. The mirror tilt actuator of claim 14, wherein
the one or more bearing members comprise one or more knife edge bearing members further comprising an angled blade portion.

20. The mirror tilt actuator of claim 14, further comprising:
one or more conductive springs for conducting instructions to a mirror unit mounted in the carriage from a processor for controlling the mirror unit.

* * * * *